United States Patent [19]

Sawada et al.

[11] 3,904,928

[45] Sept. 9, 1975

[54] FLYBACK TRANSFORMER

[75] Inventors: Hiroji Sawada, Hitachi; Yasuhiro Mizuhara, Yokohama; Tokio Isogai; Matao Nagai, both of Hitachi, all of Japan

[73] Assignee: Hitachi, Ltd., Japan

[22] Filed: Oct. 10, 1973

[21] Appl. No.: 405,056

[52] U.S. Cl. .................... 315/410; 321/2; 321/15; 336/94

[51] Int. Cl.[2] .................... H01J 29/70

[58] Field of Search ............ 336/94, 198; 321/2, 15; 323/38; 320/1; 315/27 R, 29, 28, 411, 315/409, 410

[56] References Cited

UNITED STATES PATENTS 3,510,748 5/1970 Sakamoto et al. .................... 321/15
3,562,623 2/1971 Farnsworth .................... 321/2
3,766,505 10/1973 Sato .................... 336/94

*Primary Examiner*—Malcolm F. Hubler
*Assistant Examiner*—J. M. Potenza
*Attorney, Agent, or Firm*—Craig & Antonelli

[57] ABSTRACT

A flyback transformer comprising a magnetic core and primary and secondary windings wound around the magnetic core, the secondary winding of a plurality of winding units wound on a bobbin and the same plurality of rectifying elements connected alternately in series, one terminal of the secondary winding being grounded and the other terminal thereof being connected to a picture tube, whereby a high DC voltage to be applied to the picture tube is obtained with a compact structure.

15 Claims, 11 Drawing Figures

FLYBACK TRANSFORMER

FIELD OF THE INVENTION

The present invention relates to a flyback transformer used in the high voltage generating circuit of a television receiver, of which the high voltage terminal of the secondary winding is connected to a picture tube to supply thereto high frequency DC pulses.

DESCRIPTION OF THE PRIOR ART

Commonly in a television receiver, a high voltage source for electron beam acceleration in a picture or cathode ray tube requires a high DC voltage of 10 to 30 KV. In a television receiver, a peculiar flyback transformer is utilized as a voltage step up equipment or booster to provide the high DC voltage which is obtained by repeatedly rectifying flyback pulses of a frequency of 15.75 KHz.

In a common prior art flyback transformer 1, a circuit connection of which is shown in FIG. 1, one end of the primary winding 2 thereof wound on a magnetic core 1A is connected to a DC source 4 and the other end is connected to the deflection coil 9 of a picture tube 8 and is further grounded through a direct current blocking capacitor 10, and the secondary winding 3 is connected to the picture tube 8 through a rectifying device 7. To the primary winding 2 is connected a transistor 6 which produces a sawtooth wave current as shown at (a) in FIG. 2 and to which a damper diode 5 for waveform correction is connected. In such a flyback transformer, a DC current applied by the DC source 4 to the primary coil 2 is intermitted by the transistor 6 to produce the high frequency sawtooth wave current of as high as 15.75 KHz shown at (a) in FIG. 2. This sawtooth wave current is cut off by the waveform correcting diode 5 on its negative side to produce on the secondary winding 3 a boosted pulse wave voltage as shown at (b) in FIG. 2 by the change of the state of the magnetic core made of, for example, ferrite from the saturated state to the unsaturated state corresponding to the sudden change in the current at the peaks on the positive side of the sawtooth current. The pulse wave voltage is supplied to the picture tube 8 after it is rectified by the rectifying device 7.

In the standard television system adopted in Japan, the U.S.A., etc., the horizontal scanning of the electron beam in the picture tube is made at the frequency 15.75 KHz which corresponds to the period $c = 63.5$ μsec. (FIG. 2). The high pulse voltage is produced at the flyback period $b$ of 13.5 μsec. next to the sweeping period a of 50 μsec.

In order to produce a high DC voltage to be supplied to the picture tube, a voltage doubler rectifying system employing the Cockcroft-Walton circuit composed of a flyback transformer and a plurality of rectifying elements and capacitors or a rectifying system employing a flyback transformer and a high tension-proof rectifying element is utilized. However, in the former rectifying system, although the value of the produced pulse voltage, which is a factor to be taken into account in insulating the flyback transformer, can be made low, there is the disadvantage that not only the overall system becomes bulky, but also it becomes expensive because it requires a plurality of capacitors for the rectifying section. The latter rectifying system, though it can be manufactured relatively inexpensively, has the disadvantage that it cannot be made small due to the necessity of good insulation.

The latter rectifying system will be described in more detail. The flyback transformer is such that a primary winding and a secondary winding, one terminal of which is connected to the picture tube and the other terminal of which is grounded, are wound coaxially around a magnetic core made of, for example, ferrite through an insulator and immersed in an oil such as a mineral oil in a vessel as the oil immersed type one or molded with a packing insulator such as an epoxy resin as the dry type one. The secondary winding must be insulated sufficiently against a high value and high frequency pulse voltage, in particular it is very difficult to prevent a corona discharge. Consequently, there is the disadvantage that a large occupation space is necessary for such insulation. Moreover, the rectifying element employed necessitates various countermeasures against its abnormal backward voltage share, in addition to the problem of insulation which requires the breakdown voltage or the voltage withstanding property to be more than necessary for the sake of safety. There is a further disadvantage in that a large occupation space is necessary for the insulated support of the rectifying element. Thus, the flyback transformer and the rectifying element are expensive and large, arousing the problem that the television receiver cannot be made small.

It is well known that in order to improve the characteristics of the flyback transformer by reducing the leakage inductance and the distributed capacity of the secondary winding, the secondary winding is wound on a bobbin having many winding grooves in a multi-division winding. However, also in this case, the insulation must be made against the high frequency pulse voltage as described above. For this reason, the shape of the bobbin is changed variously and/or the insulating material arranged at the magnetic core is improved, for example, to improve the voltage withstand property. However, these improvements have not been sufficient.

As the high DC voltage generator there is one as shown in FIG. 3. Around the magnetic core 21 of an electric source transformer 20, a primary winding 22 and a plurality of secondary winding units 23A, . . . , 23D are wound. The secondary winding units and the same number of semiconductor rectifiers 24A, . . . , 24D are alternately connected in series, and the secondary winding units and the same number of smoothing capacitors 25A, . . . , 25D are connected in parallel, respectively. However, this kind of high DC voltage generator is not suitable for the flyback transformer for the television for the following reason.

The voltage V produced by the flyback transformer is expressed as $V = k \sqrt{L/C}\, I$, where $k$ is a constant determined by taking the turn ratio and the increment and loss due to the high frequency into account, L is the inductance converted to the primary side of the deflection yoke and flyback transformer, C is the total capacity of the inter-winding electrostatic capacity and others converted to the primary side, and I is the current flowing through the inductance L at the end of the sweeping period. Consequently, to produce the voltage V efficiently, it is necessary to reduce the total capacity C, the greater part of which is the inter-winding and winding-to-ground electrostatic capacity of the flyback transformer, because the constant $k$, the inductance L determined by the deflection yoke and the flyback transformer, and the current I determined by the transistor current cannot be changed. The total capacity C is the equivalent capacity parallel with the primary side inductance. In the circuit as shown in FIG. 1, the electrostatic capacity on the secondary side has the effect that it is connected in parallel with the winding on the primary side as the square of the turn number n of each winding. In contrast, in the circuit of FIG. 3, since the rectifying circuit on the secondary side is a series connection in the DC sense while it is a parallel connection in the AC sense, to obtain a desired DC voltage the turn ratio can be made small because the voltage produced by each winding unit can be made low. Since, moreover, the relation between the turn number $n$ of the winding and the equivalent parallel distributed capacity C is as shown in FIG. 4, the overall parallel electrostatic capacity can be made smaller than that of FIG. 1.

However, in the flyback transformer in the television receiver, it is commonly practised to superimpose the harmonics on the fundamental wave in order to effectively utilize the period 13.5 $\mu$sec. during which the flyback pulse is generated and to improve the voltage generation efficiency, that is, to increase the output voltage and to reduce the voltage variation rate due to the variation in the load current. Since these harmonics are of 100 to 500 KHz, it is necessary to make the secondary winding capacity of the flyback transformer as low as possible. However, in the circuit of FIG. 3, not only is the overall arrangement of a large scale due to the smoothing capacitors, but also the stray capacity of the secondary winding is large and the voltage efficiency is low.

SUMMARY OF THE INVENTION

An object of the present invention is to provide a flyback transformer having its secondary winding composed of a plurality of winding units and the same number of rectifying elements alternately connected in series so that the improvement in the voltage withstanding property and the prevention of the corona discharge are easy even if the insulation is simplified, the size of the oil-immersed or dry flyback transformer can be made small, and it can be manufactured inexpensively.

Another object of the present invention is to provide a flyback transformer having its secondary winding divided into a plurality of winding units by utilizing a bobbin having a plurality of winding grooves, the winding units being connected alternately with the same number of rectifying elements in series so that the insulation of the winding and the support of the rectifying elements can be made easily and the overall size can be reduced.

A further object of the present invention is to provide a flyback transformer high in the voltage generating efficiency for the high frequency and low in the voltage source variation rate.

A still further object of the present invention is to provide a flyback transformer reduced in its section for generating a high DC voltage and suitable for the reduction of the size and weight of a television receiver.

DESCRIPTION OF THE PREFERRED EMBODIMENTS

Figure 1:
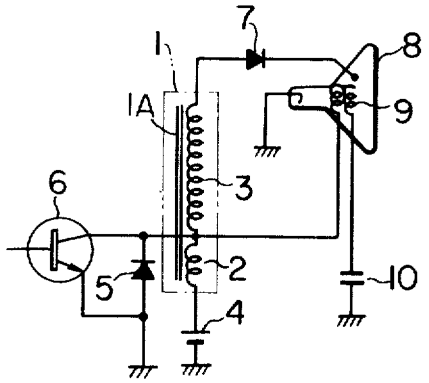
FIG. 1 PRIOR ART
FIG. 1 is a diagram of a common connection of a flyback transformer in a television receiver.
Figure 2:
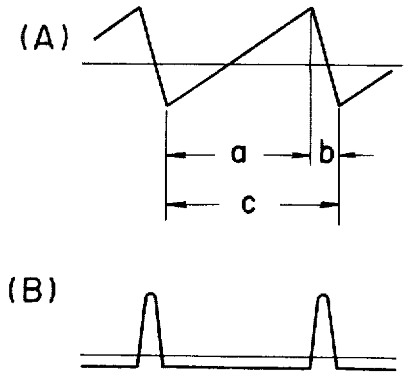
FIG. 2 shows diagrams of current and voltage waveforms of a flyback transformer.
Figure 3:
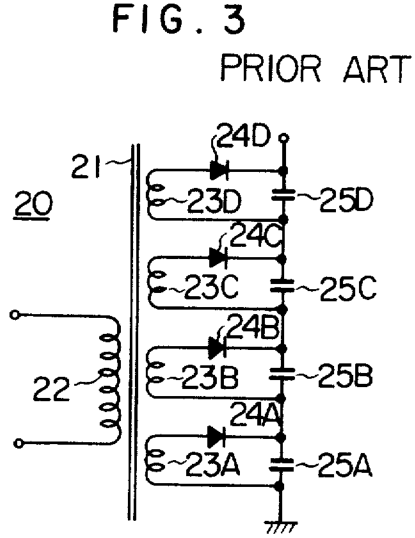
FIG. 3 PRIOR ART
FIG. 3 is a connection diagram of a prior art high DC voltage circuit arrangement.
Figure 4:
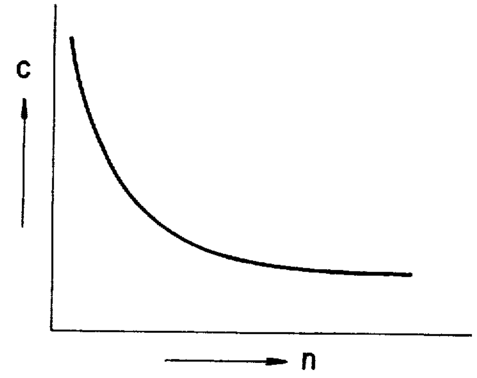
FIG. 4 is a graph of the relation between the turn number of the winding of the arrangement of FIG. 3 and the equivalent parallel distribution capacity.
Figure 5:
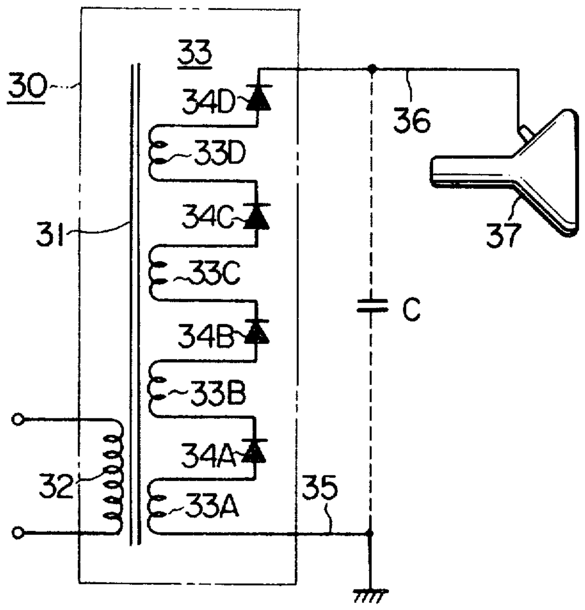
FIG. 5 is a connection diagram of a flyback transformer according to the present invention.

In the flyback transformer 30 according to the present invention as shown in FIG. 5, a secondary winding 33 around a magnetic core 31 together with a primary winding 32 is constructed as follows.

The secondary winding 33 is divided into a plurality (four in FIG. 5) of winding units 33A, . . . , 33D. These winding units are alternately connected with the same number of rectifying elements 34A, . . . , 34D in series. One end of the secondary winding 33 is substantially grounded by a lead wire 35 and the other high DC voltage side thereof is connected to a picture tube 37 by means of a high tension lead wire 36. The reference character C designates the equivalent electrostatic capacity of the load side of the rectifying elements 34A, . . . , 34D to the ground. As the rectifying elements 34a, . . . , 34D, relatively small ones such as silicon rectifiers are utilized.

Denoting the total voltage produced at the secondary winding 33 by E, a pulse voltage of E/4 is produced at the first stage winding 33A viewed from the ground and rectified by the first stage rectifying element 34A to be supplied to the second stage winding unit 33B. Then, the voltage at the winding unit 33B to the ground is the superimposition of the DC voltage E/4 on the pulse voltage E/4. Similarly, the voltage at the third stage winding unit 33C to the ground is the DC voltage E/2 plus the pulse voltage E/4, and the voltage at the fourth stage winding unit 33D to the ground is the DC voltage 3E/4 plus the pulse voltage E/4, which is rectified by the rectifying element 34D to be supplied to the picture tube 37 as the predetermined high DC voltage E.

Figure 6:
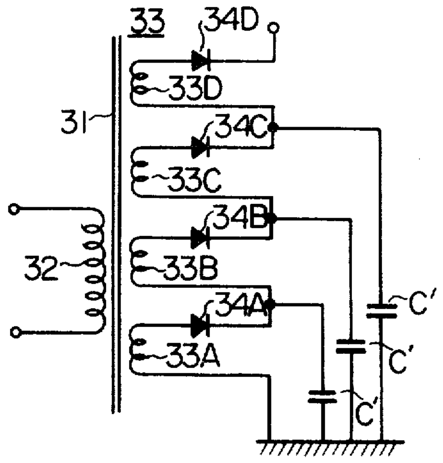
FIG. 6 is an equivalent circuit of the flyback transformer of FIG. 5.

An equivalent circuit diagram of the flyback transformer of FIG. 5 is shown in FIG. 6, in which reference character C' designates the distributed capacity between each winding unit and the ground. The present invention utilizes these distributed capacities C' in place of the prior art smoothing capacitors. Consequently, in the present invention the smoothing capacitors are unnecessary.

At the winding units 33A, . . . , 33D, the DC voltage rectified by the rectifying elements 34A, . . . , 34D, respectively, increases successively by E/4. However, since the pulse voltage component at each winding unit is E/4, the corona discharge produced depending on the variance of the voltage is very low. Consequently, the insulation of the secondary winding can be simplified enabling the flyback transformer to be manufactured in a small size. Moreover, since the inter-winding unit distributed capacity is relatively large, it is unnecessary for each of the rectifying elements to particularly consider the abnormal backward voltage share, and furthermore, to be made high in its breakdown voltage. Thus, the flyback transformer according to the present invention is inexpensive.

Since the pulse voltage at the secondary winding to the ground is low as described above, the leakage current through the distributed capacity is low, thereby enabling the flyback transformer to improve the voltage generating efficiency and reduction of the voltage variation rate.

By connecting a voltage variation preventing element (not shown) in parallel with each of the rectifying elements 34A, . . . , 34D, not only can the voltage variation preventing element commonly provided for the series high voltage generating circuit be eliminated, but also the voltage variation preventing elements can do with ones of a low capacity. Consequently, the flyback transformer according to the present invention is easy in its insulation and very simple in its manufacture. As is well known, resistors or Zener diodes are utilized as the voltage variation preventing elements.

Figure 7:
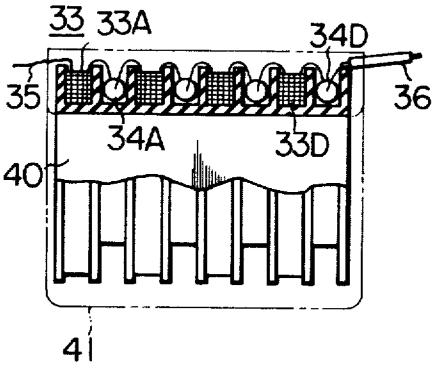
FIGS. 7 and 8 are elevational views, partly in cross-section, of the secondary windings of flyback transformers according to the present invention.
Figure 8:
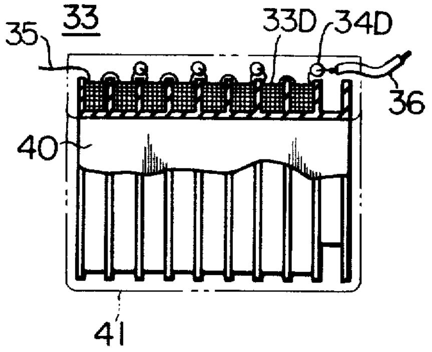

The above secondary winding 33 of the flyback transformer is constructed as shown in FIGS. 7 and 8. In the examples shown in FIGS. 7 and 8 a bobbin 40 having a plurality of winding grooves spaced by collars are utilized. In the example of FIG. 7 the winding units 33A, . . . , 33D are wound on every other winding groove, and in the vacant winding grooves are arranged the rectifying elements 34A, . . . , 34D which are alternately connected with the winding units 33A, . . . , 33D in series and are provided with a grounding lead wire 35 and a high DC voltage lead wire 36. By arranging the rectifying elements in the winding grooves of the bobbin 40 in this manner, not only the support thereof becomes simple but also the overall diameter is prevented from becoming larger. Moreover, since the abnormal share of the backward voltage is reduced by the electrostatic capacity between the rectifying elements and the secondary winding as described above, as the rectifying elements 34A, . . . , 34D, large capacity ones are not necessary. Also, the current due to the inter-winding unit electrostatic capacity can be reduced to a negligible degree and the total distributed capacity of the secondary winding becomes very low. Consequently, the voltage generation efficiency and the reduction in the voltage variation of the flyback transformer determined by these factors can be improved.

In the secondary winding 33 shown in FIG. 8, the winding units 33A, . . . , 33D are successively wound on the winding grooves of the bobbin 40, and the rectifying elements 34A, . . . , 34D are arranged around the periphery of the bobbin 40. Since the rectifying elements are of a low capacity, their mounting is easy and they add little to the size of the flyback transformer.

The secondary winding shown in FIGS. 7 and 8 is molded with a packaging insulator material 41 of a thermo-setting resin such as an epoxy resin as indicated by the chain or dash-dot line so that the insulating property, and hence the breakdown voltage or the voltage withstanding property, is improved. If the winding groove of the bobbin next to the highest voltage winding unit 33D is made vacant, the dielectric breakdown is prevented to improve the reliability of the flyback transformer because the leakage distance increases.

Figure 9:
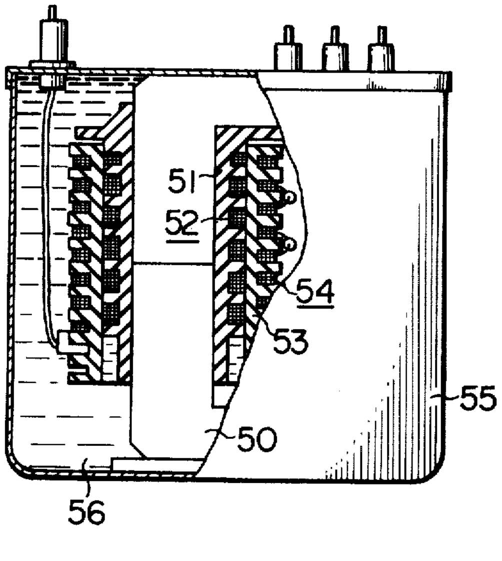
FIG. 9 is an elevational view, partly in cross-section, of an oil-immersed flyback transformer according to the present invention.

An oil-immersed flyback transformer is manufactured, as shown in FIG. 9, by arranging a primary winding 52 wound on a bobbin 51 and a secondary winding 54 consisting of a plurality of winding units wound on the winding grooves of a bobbin 53 and rectifying elements of a low capacity alternately connected in series coaxially around one leg of a magnetic core 50, by providing predetermined terminals, and by immersing the resulting structure in an oil 56 such as a mineral oil sealed in a vessel 55. This oil-immersed flyback transformer is markedly improved in the electric characteristics, particularly such as the voltage withstanding property and the anti-corona discharge property.

Figure 10:
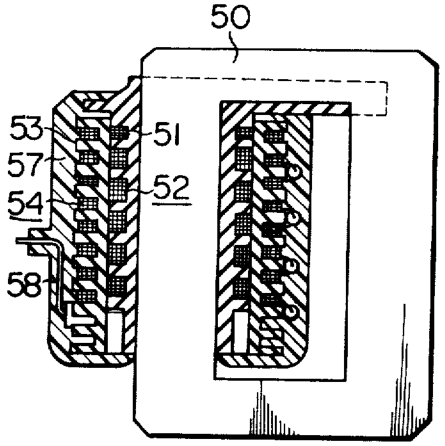
FIG. 10 is a vertical cross-section of a dry flyback transformer according to the present invention.

A dry flyback transformer is manufactured, as shown in FIG. 10, by coaxially arranging the primary winding 52 on the bobbin 51 and the secondary winding 54 on the bobbin 53 around one leg of the magnetic core 50 similarly to the above-described oil-immersed flyback transformer, and at least the high voltage secondary winding 54 of the primary and secondary windings is molded in a packing insulator material 57 such as an epoxy resin. Since the overall size of the dry flyback transformer is very small, it is easily assembled in a television receiver. If the high DC voltage lead wire 58 of the secondary winding 54 to be molded in the packing insulating material 57 is made to be lead out from the central part, the insulation of that part is further improved.

Figure 11:
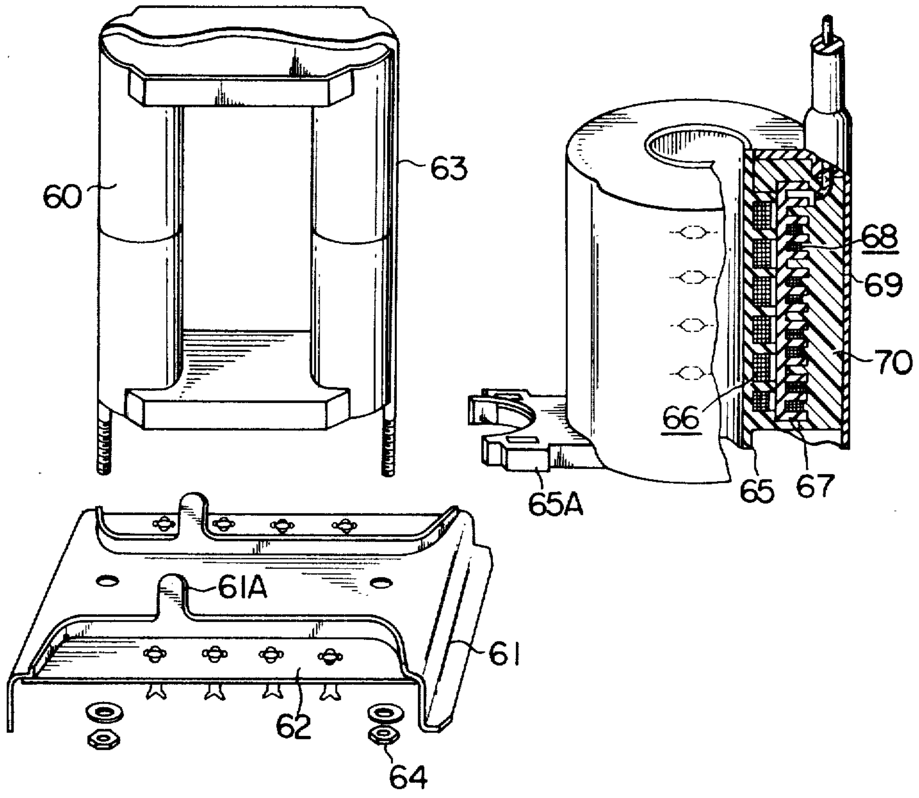
FIG. 11 is a perspective view of another dry flyback transformer according to the present invention.

A more practical form of the flyback transformer is shown in FIG. 11. A magnetic core 60 is divided into two legs which are fixed to a press worked mount 61 by clamping bolts 63 and nuts 64 into an integral unit. On the underside of the mount 61 is mounted a terminal board 62 also by the clamping bolts 63 and the nuts 64. Before the magnetic core 60 is fixed to the mount 61, a primary winding 66 wound on a bobbin 65 and a secondary winding 68 wound on a bobbin 67 are mounted on the leg of the magnetic core 60. The primary and secondary windings 66 and 68 wound on the bobbins 65 and 67, respectively, may be molded, in an integrally combined state, in a thermo-setting resin or may be embedded in a setting material such as a synthetic resin 70 within an insulating casing 69 as shown. When the insulating casing 69 is utilized, the manufacture of the winding part is very simple and can be made compact. An extension 65A of the bobbin 66 engaging with projections 61A of the mount 61 is utilized for positioning of the winding part. This type of flyback transformer has the above-described advantages and is very suitable for the application to a television receiver.

We claim:

1. A flyback transformer comprising a magnetic core and primary and secondary windings wound around said magnetic core, said secondary winding including a plurality of winding units wound on a plurality of winding grooves of a bobbin and a plurality of rectifying elements of small capacity, the number of winding units in said plurality of winding units being equal to the number of rectifying elements in said plurality of rectifying elements, said winding units being connected only by said rectifying elements alternately in series, one terminal of said secondary winding being substantially grounded and the other terminal thereof being connected to a picture tube.

2. A flyback transformer according to claim 1, wherein each of the rectifying elements is connected in parallel with a voltage variation preventing element.

3. A flyback transformer according to claim 1, wherein the winding units are wound on every other winding groove and the rectifying elements are arranged in every other vacant winding groove.

4. A flyback transformer according to claim 1, wherein the rectifying elements are arranged around the periphery of the bobbin.

5. A flyback transformer according to claim 1, wherein the winding groove next to the winding unit of the highest potential is vacant.

6. A flyback transformer according to claim 1, wherein the magnetic core with the primary and secondary windings is immersed in an oil sealed in a vessel.

7. A flyback transformer according to claim 1, wherein at least the secondary winding is molded with a packing insulating material of a thermo-setting resin.

8. A flyback transformer comprising a magnetic core and primary and secondary windings wound coaxially around said magnetic core, said magnetic core being divided into two legs, the legs being rigidly fixed to a mount, each of said primary and secondary windings being wound on winding grooves of a bobbin, said secondary winding including a plurality of winding units wound on said winding grooves of the bobbin for said secondary winding and a plurality of rectifying elements of small capacity, the number of winding units in said plurality of winding units being equal to the number of rectifying elements in said plurality of rectifying elements, said winding units being connected only by said rectifying elements alternately in seies, one terminal of said secondary winding being substantially grounded and the other terminal thereof being connected to a picture tube.

9. A flyback transformer according to claim 8, wherein the magnetic core with the primary and secondary windings is buried in a setting synthetic resin in a casing.

10. A flyback transformer including a primary winding and a secondary winding both wound around a magnetic core, said secondary winding having a first terminal and a second terminal and comprising a series connection of alternately connected winding units and rectifying elements, the number of said winding units in said series connection being equal to the number of said rectifying elements in said series connection, said winding units being connected only by said rectifying elements, the terminal of the winding unit at one end of said series connection forming said first terminal of said secondary winding, the terminal of the rectifying element at the other end of said series connection forming said second terminal of said secondary winding, said first terminal of said secondary winding being connected to ground and said second terminal of said secondary winding adapted to be connected to a picture tube.

11. A flyback transformer as defined in claim 10, wherein said terminal of said rectifying element at said other end of said series connection is the cathode terminal of said rectifying element and each of said rectifying elements in said series connection has its anode terminal connected to a respective preceding winding unit in said series connection.

12. A flyback transformer as defined in claim 11, wherein each of said rectifying elements is connected in parallel with a voltage variation preventing element.

13. A flyback transformer as defined in claim 12, wherein said voltage variation preventing element is a resistor or a Zener diode.

14. A flyback transformer as defined in claim 11, wherein said series connection of alternately connected winding units and rectifying elements is formed in a plurality of grooves of a bobbin, each of said winding units and said rectifying elements lying in a different one of said plurality of grooves, the grooves containing winding units being alternately arranged with the grooves containing rectifying units.

15. A flyback transformer as defined in claim 11, wherein said winding units in said series connection of alternately connected winding units and rectifying elements are formed in a plurality of grooves of a bobbin, each of said winding units lying in a different one of said plurality of grooves; and said rectifying elements in said series connection are arranged around the periphery of said bobbin.

* * * * *